US012669169B2

(12) United States Patent　　　　(10) Patent No.:　US 12,669,169 B2

Nagai et al.　　　　　　　　　　　(45) Date of Patent:　　Jun. 30, 2026

---

(54) WORKING VEHICLE

(71) Applicant: Kubota Corporation, Osaka (JP)

(72) Inventors: Kotaro Nagai, Sakai (JP); Yuichi Nakamukai, Sakai (JP); Ryoma Iwase, Sakai (JP); Takanori Ito, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/981,879

(22) Filed: Dec. 16, 2024

(65) Prior Publication Data

US 2025/0207659 A1　　Jun. 26, 2025

(30) Foreign Application Priority Data

Dec. 22, 2023　(JP) ................................. 2023-216818

(51) Int. Cl.
*F16H 47/02*　　(2006.01)
*F16H 57/021*　　(2012.01)
*F16H 57/02*　　(2012.01)

(52) U.S. Cl.
CPC ........... *F16H 47/02* (2013.01); *F16H 57/021* (2013.01); *F16H 2057/02056* (2013.01)

(58) Field of Classification Search
CPC ................... F16H 57/02; F16H 57/021; F16H 2057/0216; F16H 57/02056
See application file for complete search history.

(56) References Cited

U.S. PATENT DOCUMENTS

| | | | | |
|---|---|---|---|---|
| 7,841,430 B2* | 11/2010 | Shiba | ..................... | B60K 17/34 |
| | | | | 74/15.84 |
| 8,657,713 B2* | 2/2014 | Hana | ....................... | F16H 47/04 |
| | | | | 180/53.4 |
| 2012/0046138 A1 | 2/2012 | Hana et al. | | |

FOREIGN PATENT DOCUMENTS

| | | | | |
|---|---|---|---|---|
| JP | 2012040944 A | 3/2012 | | |
| WO | WO-2015045437 A1* | 4/2015 | ............. | F16H 61/42 |

\* cited by examiner

*Primary Examiner* — Bobby Rushing, Jr.
(74) *Attorney, Agent, or Firm* — Keating & Bennett, LLP

(57) ABSTRACT

A working vehicle includes a hydraulic transmission chamber to accommodate a hydraulic pump and a hydraulic motor driven by fluid delivered from the hydraulic pump, and a primary transmission casing to accommodate a primary transmission that includes an input gear to receive power from a prime mover and a transmission gear to transmit the power transmitted from the input gear to the hydraulic pump. The primary transmission casing is adjacent to the hydraulic transmission chamber. An interior of the primary transmission casing is separated from the hydraulic transmission chamber.

7 Claims, 15 Drawing Sheets

Enlarged portion A

WORKING VEHICLE

CROSS REFERENCE TO RELATED APPLICATIONS

This application claims the benefit of priority to Japanese Patent Application No. 2023-216818, filed on Dec. 22, 2023. The entire contents of this application are hereby incorporated herein by reference.

BACKGROUND OF THE INVENTION

1. Field of the Invention

The present invention relates to working vehicles.

2. Description of the Related Art

A known working vehicle in the related art is disclosed in Japanese Unexamined Patent Application Publication No. 2012-40944.

The working vehicle disclosed in Japanese Unexamined Patent Application Publication No. 2012-40944 includes a continuously-variable-transmission casing and a primary transmission casing. The continuously-variable-transmission casing includes a hydraulic transmission chamber that accommodates a hydraulic pump and a hydraulic motor driven by fluid delivered from the hydraulic pump. The primary transmission casing is adjacent to the hydraulic transmission chamber and accommodates a primary transmission (distributive transmission 15A) including an input gear that receives power from a prime mover, and also including a transmission gear that transmits the power transmitted from the input gear to the hydraulic pump.

SUMMARY OF THE INVENTION

In the working vehicle in the related art, the hydraulic transmission chamber is completely filled with the fluid, and the primary transmission casing is in a state where the fluid flows to and from the hydraulic transmission chamber. Hence, the interior of the primary transmission casing is also completely filled with the fluid. When the primary transmission casing is completely filled with the fluid, there is a problem in that a gear stirring resistance inside the primary transmission casing is large. When the gear stirring resistance inside the primary transmission casing is large, a horsepower loss occurs due to the large gear stirring resistance.

In view of the aforementioned problem, example embodiments of the present invention provide working vehicles that each reduce the gear stirring resistance within the primary transmission casing provided adjacent to the hydraulic transmission chamber that accommodates the hydraulic pump and the hydraulic motor.

A working vehicle includes a hydraulic transmission chamber to accommodate a hydraulic pump and a hydraulic motor driven by fluid delivered from the hydraulic pump, and a primary transmission casing to accommodate a primary transmission including an input gear to receive power from a prime mover and a transmission gear to transmit power from the input gear to the hydraulic pump. The primary transmission casing is adjacent to the hydraulic transmission chamber. An interior of the primary transmission casing is separated from the hydraulic transmission chamber.

The working vehicle may include an orifice to allow the hydraulic transmission chamber and the interior of the primary transmission casing to communicate with each other. The hydraulic transmission chamber and the interior of the primary transmission casing may be separated from each other such that fluid in the hydraulic transmission chamber does not flow into the primary transmission casing through or in any portion except for the orifice.

The working vehicle may include a supply pump to replenish the hydraulic transmission chamber with purged fluid, and an outflow passage to cause fluid inside the primary transmission casing to flow out. A fluid flow amount of fluid flowing through the orifice may be such that the hydraulic transmission chamber is completely filled with fluid and a fluid level of the fluid inside the primary transmission casing is located at a vertically intermediate portion inside the primary transmission casing.

The working vehicle may include a continuously-variable-transmission casing including the hydraulic transmission chamber, and a travel-drive transmission casing to accommodate a travel-drive transmission operable to speed-change power output from the hydraulic motor and transmit the speed-changed power to a drive wheel. The travel-drive transmission casing may be coupled to a portion of the continuously-variable-transmission casing opposite from the primary transmission casing. The supply pump may be operable to replenish the hydraulic transmission chamber with fluid sucked from the inside of the travel-drive transmission casing via an oil filter. The outflow passage may be configured to cause fluid inside the primary transmission casing to flow out into the travel-drive transmission casing.

The input gear may be located at an upper portion inside the primary transmission casing and higher than the first transmission gear. The orifice may be located at a height within a range of a tip diameter of the input gear.

The working vehicle may include a plug to block a through-hole extending through a wall and to separate the hydraulic transmission chamber and the interior of the primary transmission casing from each other. The orifice may be provided in the plug.

The orifice may include a first hole communicating with the hydraulic transmission chamber, and a second hole having a diameter larger than a diameter of the first hole to allow the first hole and the interior of the transmission casing to communicate with each other.

The orifice may include an increasing-diameter hole that connects the first hole and the second hole to each other. The increasing-diameter hole may gradually increase in diameter from the first hole toward the second hole.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
FIG. 1 is a side view of a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below while referring to the drawings, as appropriate.

FIG. 1 illustrates a side view of a working vehicle 1 according to this example embodiment. In this example embodiment, a tractor is illustrated as an example of the working vehicle 1. Although the working vehicle 1 is described as being a tractor below, the working vehicle 1 is not limited to a tractor.

As illustrated in FIG. 1, the tractor 1 includes an operator's seat 2 where an operator sits.

In the following description, a direction extending forward (direction of an arrow A1 in FIG. 1) from the operator sitting in the operator's seat 2 will be described as a forward direction, and a direction extending rearward (direction of an arrow A2 in FIG. 1) from the operator will be described as a rearward direction. A direction extending leftward (toward the viewer of FIG. 1) from the operator will be described as a leftward direction, and a direction extending rightward (away from the viewer of FIG. 1) will be described as a rightward direction.

A direction indicated by an arrow K1 in FIG. 1 will be described as a front-rear direction. A horizontal direction orthogonal to the front-rear direction K1 will be described as a vehicle-body width direction. In the vehicle-body width direction, a direction extending from the middle toward the right or the left of the tractor 1 will be described as a vehicle-body-width outward direction. In the vehicle-body width direction, a direction extending from the right or the left of the tractor 1 toward the middle of the tractor 1 will be described as a vehicle-body-width inward direction.

As illustrated in FIG. 1, the tractor 1 includes a vehicle body 3, front wheels 4 located at the left and right of a front portion of the vehicle body 3, rear wheels 5 located at the left and right of a rear portion of the vehicle body 3, and an operation portion 7 located higher than the vehicle body 3 and including a steering wheel 6, the operator's seat 2, and the like. The front wheels 4 are steered wheels that are steerable. In this example embodiment, the front wheels 4 and the rear wheels 5 are drive wheels that are drivable. The drive wheels may be the rear wheels 5 alone, or may be the front wheels 4 alone. The front wheels 4 and the rear wheels 5 define a traveling device that supports the vehicle body 3 in a travelable manner.

As illustrated in FIG. 1, the vehicle body 3 includes an engine (prime mover) 8 as a power source, a front frame coupled to the engine 8 and protruding forward from the engine 8, and a power transmitting case 10 coupled to a rear portion of the engine 8 and extending rearward from the engine 8. A power take-off (PTO) shaft 9 that extracts power of the engine 8 to the outside is located at a rear portion of the power transmitting case 10 (vehicle body 3).

In this example embodiment, the engine 8 is a diesel engine. The engine 8 may be a gasoline engine. The power source may be a prime mover other than an engine. For example, the power source may be an electric motor.

Figure 2:
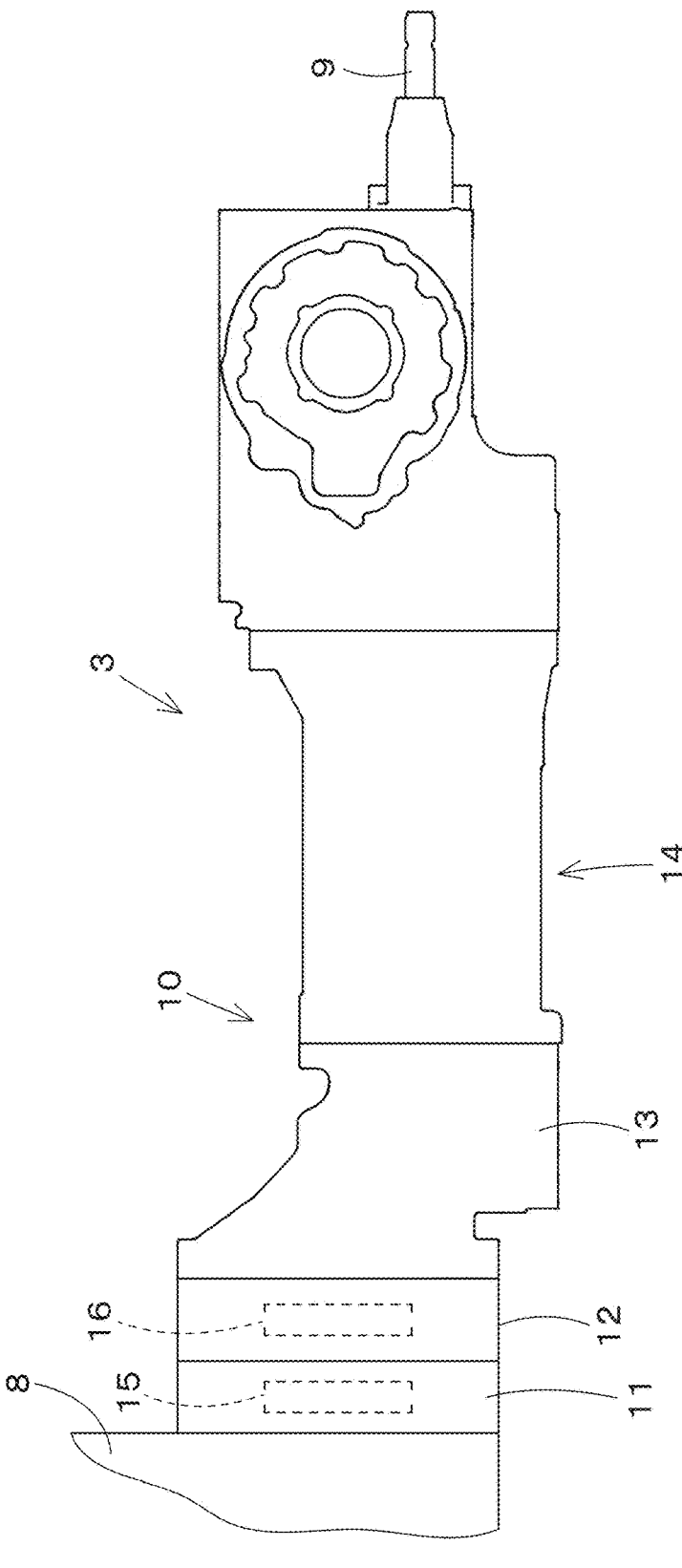
FIG. 2 is a side view of a power transmitting case.

As illustrated in FIG. 2, the power transmitting case 10 includes a flywheel housing 11 coupled to the rear portion of the engine 8, a clutch housing 12 coupled to a rear portion of the flywheel housing 11, a continuously-variable-transmission casing 13 coupled to a rear portion of the clutch housing 12, and a travel-drive transmission casing 14 coupled to a rear portion of the continuously-variable-transmission casing 13.

The flywheel housing 11 accommodates a flywheel 15 that rotates integrally with a crankshaft of the engine 8. The clutch housing 12 accommodates a main clutch 16 that intermittently transmits the power of the engine 8 transmitted via the flywheel 15. The continuously-variable-transmission casing 13 accommodates a hydraulic pump (called an HST pump) 18 and a hydraulic motor (called an HST motor) 19 included in a continuously variable transmission (hydrostatic continuously variable transmission (HST)) 17 (see FIGS. 8 and 9). The travel-drive transmission casing 14 accommodates a travel-drive transmission (see FIG. 3) 20 that speed-changes power output from the continuously variable transmission 17 and transmits the power to the drive wheels.

Figure 3:
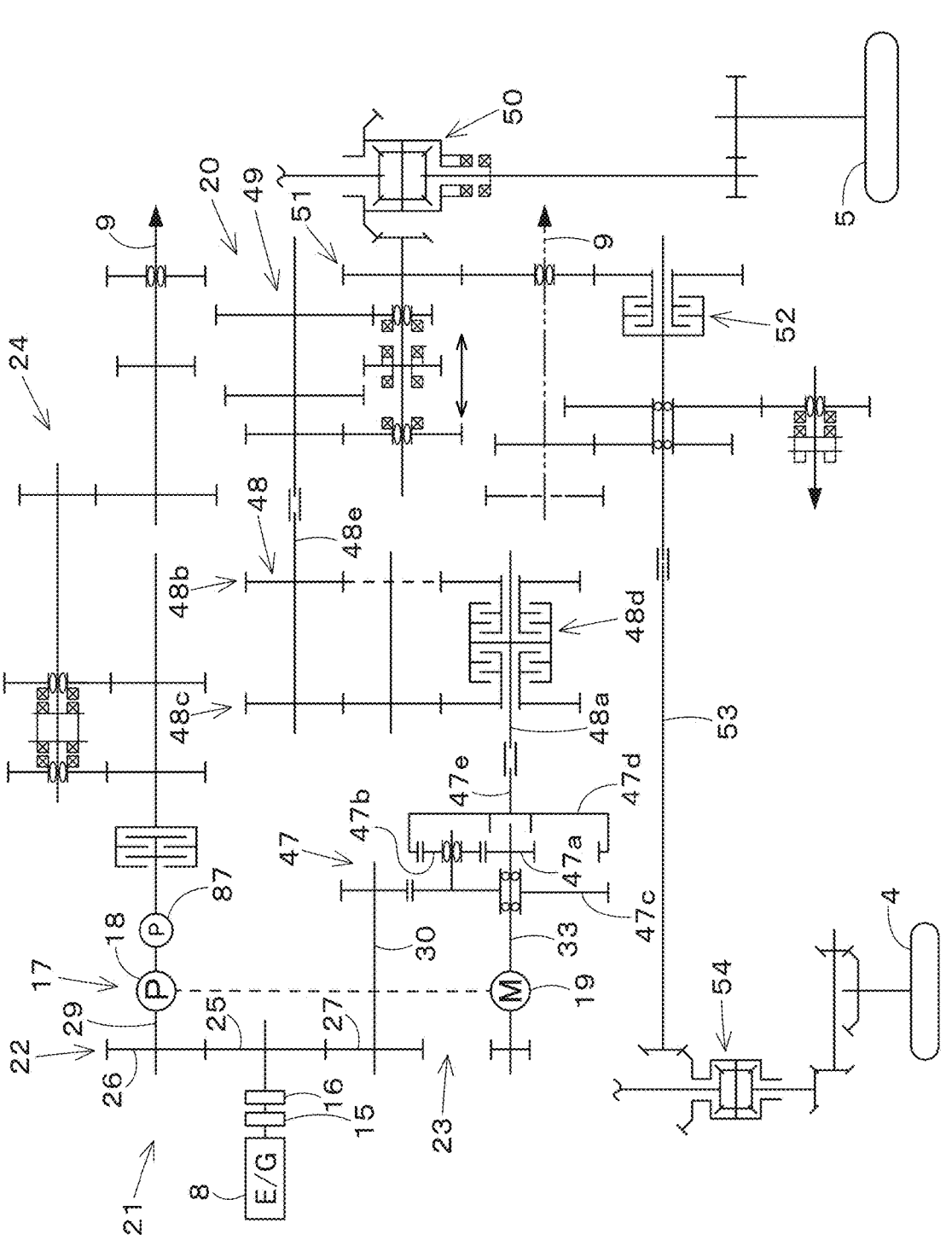
FIG. 3 illustrates a power transmitting system that transmits power of an engine.

FIG. 3 illustrates a primary power transmitting system 21 that transmits the power of the engine 8. The primary power transmitting system 21 includes a primary transmission 22 that distributively transmits the power of the engine 8, a travel-power transmitting system 23 that transmits the power of the engine 8 to the drive wheels (the front wheels 4 and/or the rear wheels 5), and a PTO-power transmitting system 24 that transmits the power of the engine 8 to the PTO shaft 9.

Figure 8:
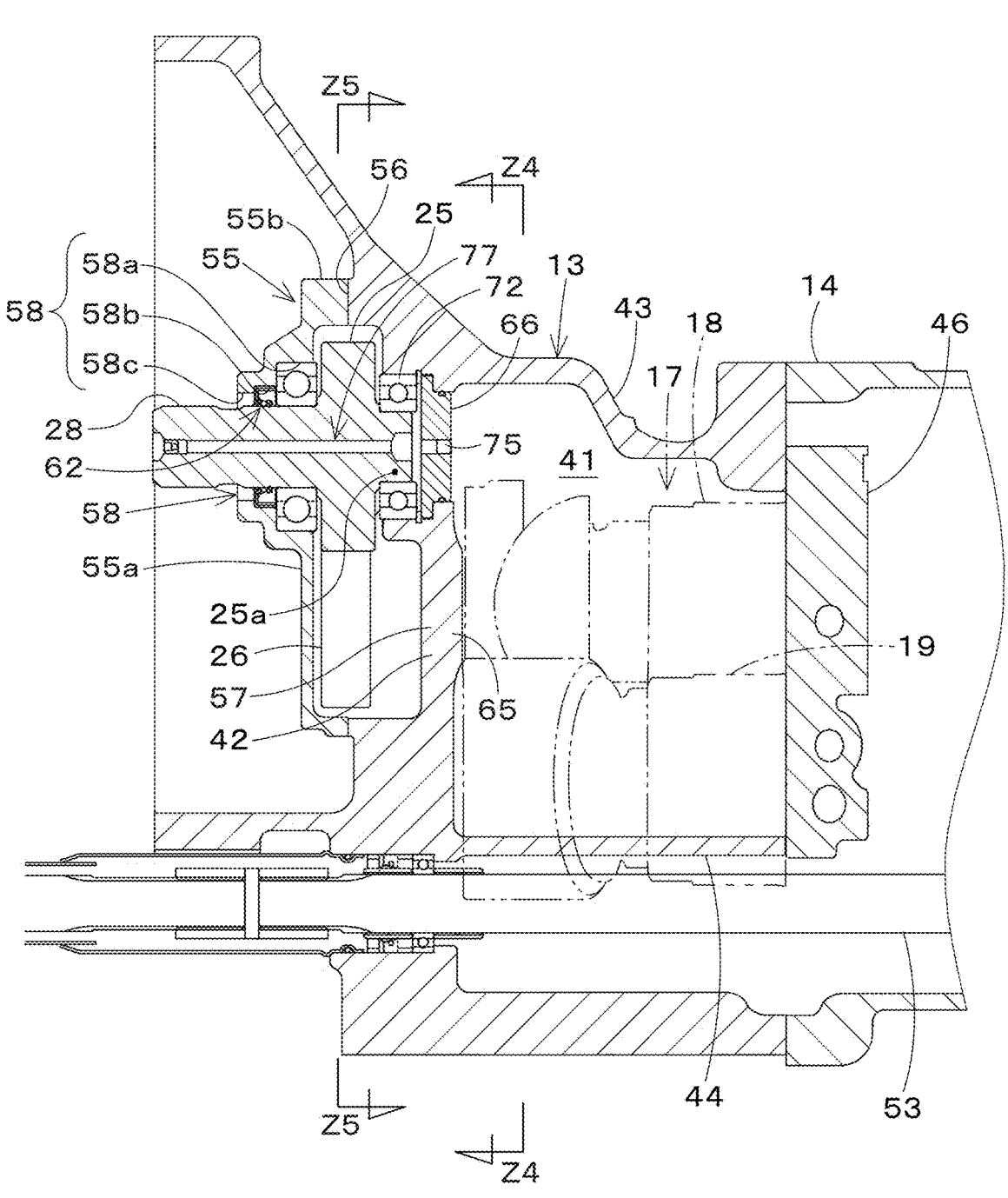
FIG. 8 is a diagram taken along line Z1-Z1 in FIG. 5.

As illustrated in FIG. 3, the primary transmission 22 includes an input gear 25 and a pair of transmission gears 26 and 27. As illustrated in FIG. 8, the input gear 25 is integrated with a shaft 28 extending forward from the input gear 25. The power of the engine 8 after the flywheel 15 and the main clutch 16 is transmitted to the input gear 25 via the shaft 28. As illustrated in FIG. 8, the input gear 25 includes a supported portion 25a protruding rearward from the rotation center.

Figure 12:
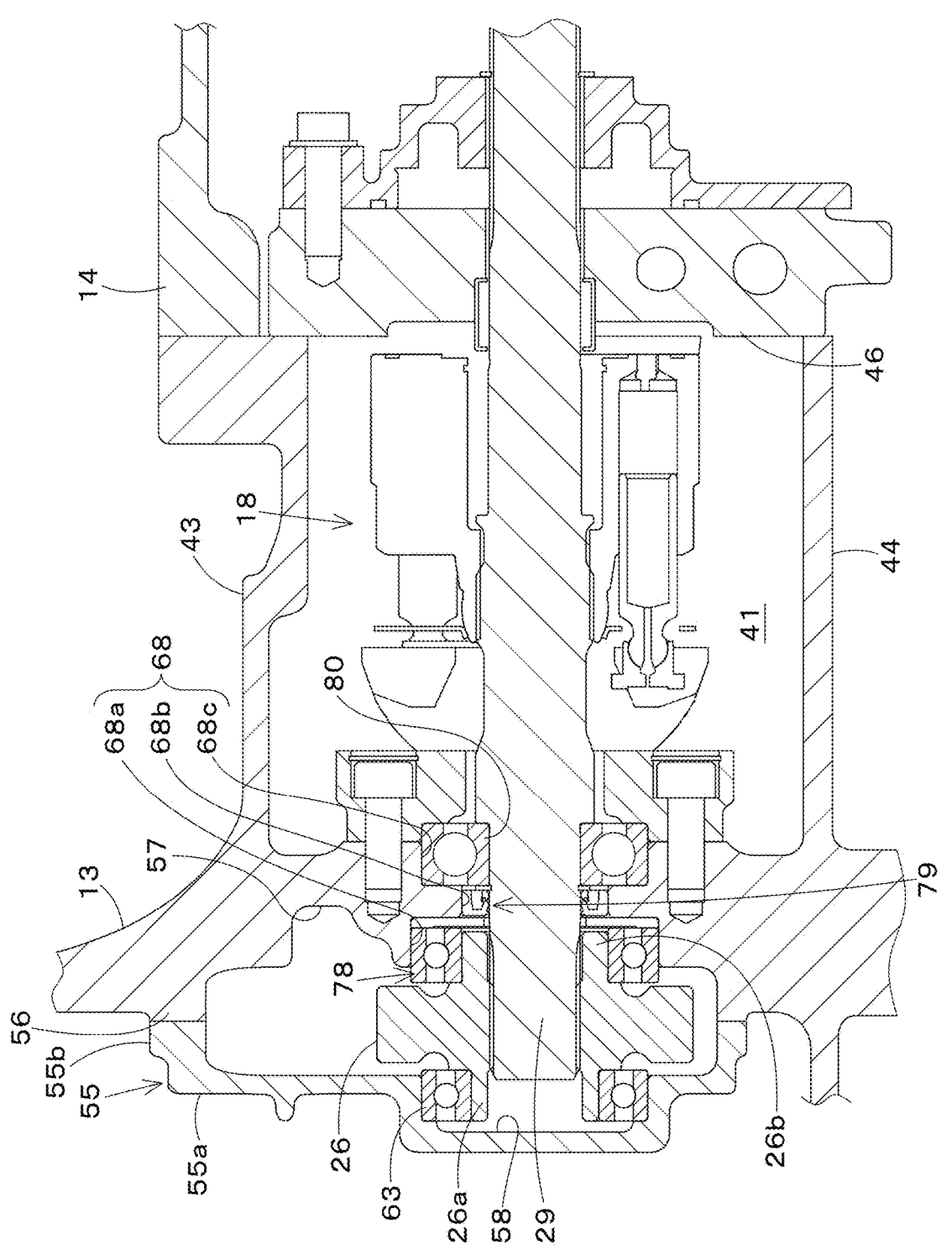
FIG. 12 is a diagram taken along line Z2-Z2 in FIG. 5.
Figure 13:
FIG. 13 is a diagram taken along line Z3-Z3 in FIG. 5.

As illustrated in FIG. 3, the input gear 25 meshes with the pair of transmission gears 26 and 27 and transmits the power to the pair of transmission gears 26 and 27. The first transmission gear 26 as one of the gears in the pair of transmission gears 26 and 27 rotates integrally with a first transmitting shaft 29. The second transmission gear 27 as the other one of the gears in the pair of transmission gears 26 and 27 rotates integrally with a second transmitting shaft 30. As illustrated in FIG. 12, the first transmission gear 26 includes a first supported portion 26a protruding forward and a second supported portion 26b protruding rearward. As illustrated in FIG. 13, the second transmission gear 27 includes a first supported portion 27a protruding forward and a second supported portion 27b protruding rearward.

As illustrated in FIG. 3, the travel-power transmitting system 23 includes a continuously variable transmission 17 to which the power from the engine 8 is transmitted, and the travel-drive transmission 20 that speed-changes the power output from the continuously variable transmission 17 and transmits the power to the drive wheels.

First, the continuously variable transmission 17 will be described.

As mentioned above, the continuously variable transmission 17 includes the HST pump 18 and the HST motor 19. The HST pump 18 is driven by the power from the engine 8. The HST motor 19 is rotationally driven by fluid delivered from the HST pump 18.

Figure 4:
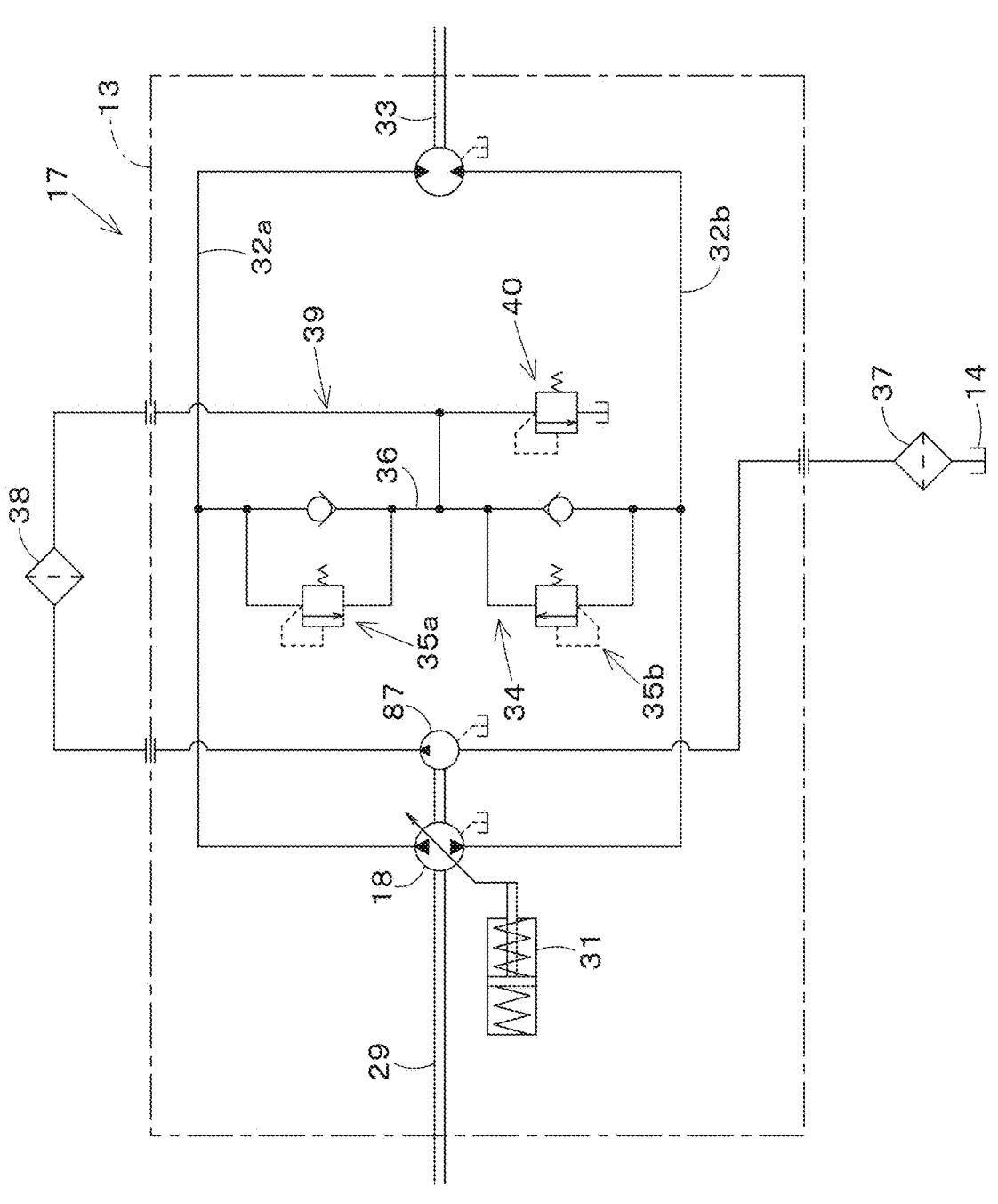
FIG. 4 is a hydraulic circuit diagram of a hydro-static continuously variable transmission.

As illustrated in FIG. 4, the HST pump 18 includes a swash-plate variable displacement pump. The power from the engine 8 is transmitted to the HST pump 18 via the first transmitting shaft 29, and the HST pump 18 is driven by rotational power of the first transmitting shaft 29. With regard to the HST pump 18, the angle of the swash plate is changed by a cylinder 31 by operating the cylinder 31 operating in conjunction with the swash plate, whereby the delivery amount and the delivery direction are changeable. The HST motor 19 is closed-circuit-connected to the HST pump 18 by a pair of transmission fluid passages 32a and 32b. The HST motor 19 is rotationally driven in the forward rotational direction or the reverse rotational direction by the fluid delivered from the HST pump 18, and outputs, from a motor shaft 33, rotational power steplessly speed-changed and rotated in either of the forward rotational direction and the reverse rotational direction.

The continuously variable transmission 17 can be set to a neutral state located between the forward rotational state and the reverse rotational state by changing the angle of the swash plate of the HST pump 18.

As illustrated in FIG. 4, of the pair of transmission fluid passages 32a and 32b, the lower-pressure transmission fluid passage 32a or 32b can be replenished with fluid via a charge circuit 34. The charge circuit 34 includes high-pressure relief valves 35a and 35b that release pressure to the lower-pressure transmission fluid passage 32a or 32b when the pressure in the higher-pressure transmission fluid passage 32a or 32b becomes higher than or equal to a set value, a fluid passage 36 between the high-pressure relief valve 35a and the high-pressure relief valve 35b, and a replenishment fluid passage 39 connected to the fluid passage 36. The fluid passage 36 is supplied with delivery fluid from a supply pump (charge pump) 87. Specifically, the supply pump 87 is driven by the first transmitting shaft 29 to suction fluid (transmission fluid) in the travel-drive transmission casing 14 via an oil filter 37 and delivers the fluid. The fluid delivered from the supply pump 87 flows to the fluid passage 36 via an oil filter 38 and the replenishment fluid passage 39. The charge circuit 34 includes a charge relief valve 40 that sets the circuit pressure in the charge circuit 34, and the charge relief valve 40 communicates with the replenishment fluid passage 39.

Figure 9:
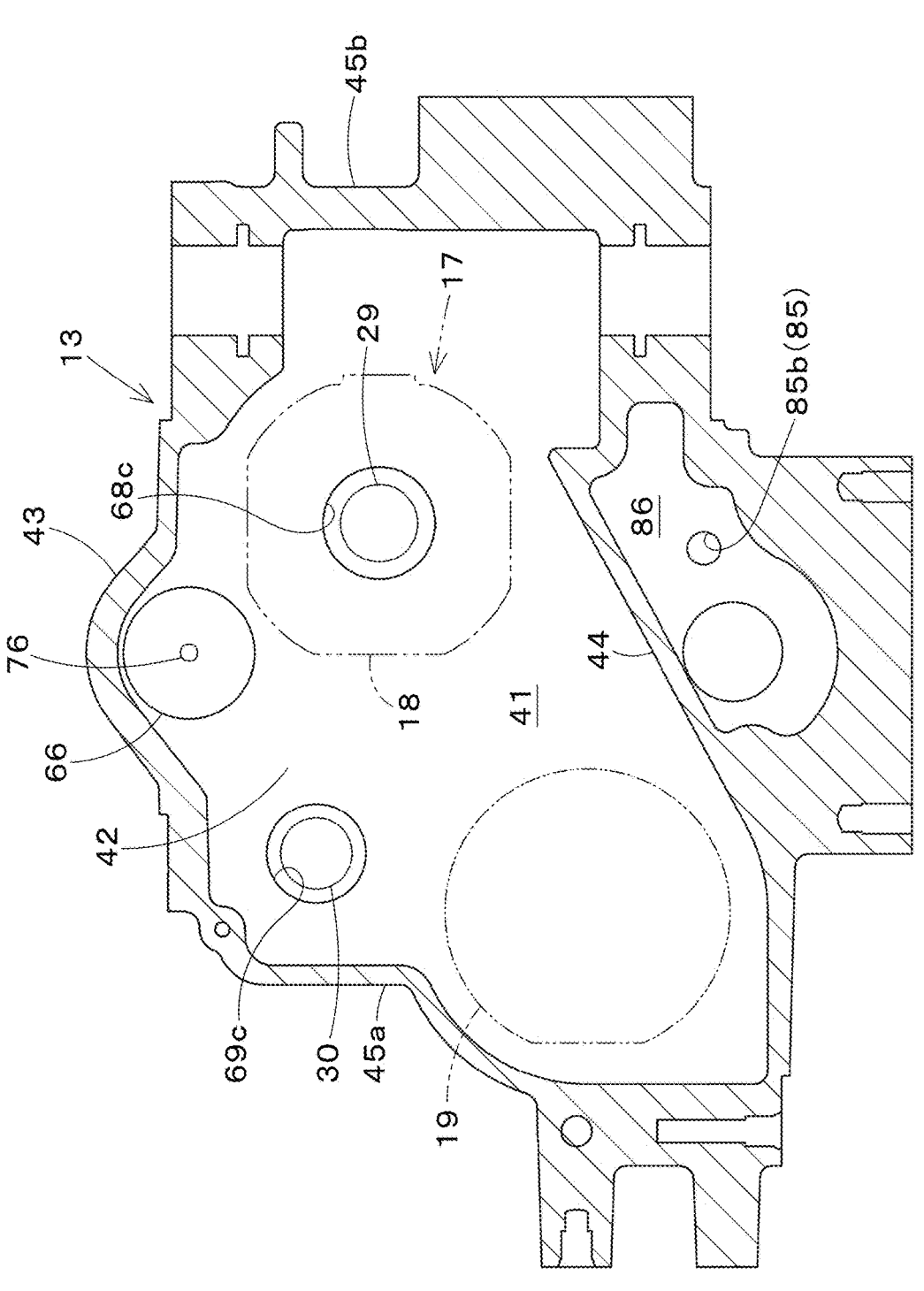
FIG. 9 is a diagram taken along line Z4-Z4 in FIG. 8.

As illustrated in FIGS. 8 and 9, the continuously-variable-transmission casing 13 includes a hydraulic transmission chamber 41 that accommodates the HST pump 18 and the HST motor 19. The hydraulic transmission chamber 41 includes a front wall 42 serving as a front portion of the hydraulic transmission chamber 41, a top wall 43 serving as a top portion, a bottom wall 44 serving as a bottom portion, left and right sidewalls 45a and 45b serving as left and right portions, and a port plate 46 serving as a rear portion.

The interior of the hydraulic transmission chamber 41 is completely filled with fluid. The fluid (purged fluid) from the supply pump 87 is suppliable into the hydraulic transmission chamber 41. For example, the fluid can be replenished into the hydraulic transmission chamber 41 from the replenishment fluid passage 39.

Next, the travel-drive transmission 20 will be described.

As illustrated in FIG. 3, the travel-drive transmission 20 includes a planetary gear mechanism 47, a forward-rearward-travel switching mechanism 48, and a secondary transmission mechanism 49. The planetary gear mechanism 47 includes a sun gear 47a, a plurality of planetary gears 47b provided around the sun gear 47a, a carrier 47c that rotatably supports each planetary gear 47b, a ring gear 47d that meshes with the plurality of planetary gears 47b, and an output shaft 47e that outputs power.

Rotational power output from the motor shaft 33 of the HST motor 19 is input to the sun gear 47a. Rotational power of the second transmitting shaft 30 is input to the carrier 47c. The planetary gear mechanism 47 combines a driving force from the continuously variable transmission 17 with a driving force from the engine 8 not affected by a speed-changing operation of the continuously variable transmission 17, and outputs the combined driving force from the output shaft 47e to an input shaft 48a of the forward-rearward-travel switching mechanism 48.

The forward-rearward-travel switching mechanism 48 outputs the driving force transmitted to the input shaft 48a from either of a forward-travel output gear train 48b that transmits forward-travel power and a rearward-travel gear train 48c that transmits rearward-travel power. The forward-rearward-travel switching mechanism 48 includes a switch clutch 48d that switches the power transmitting mode between a forward-travel transmitting mode and a rearward-travel transmitting mode.

The secondary transmission mechanism 49 switches power output from an output shaft 48e of the forward-rearward-travel switching mechanism 48 to any of a lower speed mode, an intermediate speed mode, and a high speed mode, and outputs the power. The power output from the secondary transmission mechanism 49 is transmitted to the rear wheels 5 via a rear-wheel differential mechanism 50. The power output from the secondary transmission mechanism 49 is transmitted to the front wheels 4 via a front-wheel-power extracting gear train 51, a clutch mechanism 52, a front-wheel-power transmitting shaft 53, a front-wheel differential mechanism 54, and the like.

Figure 5:
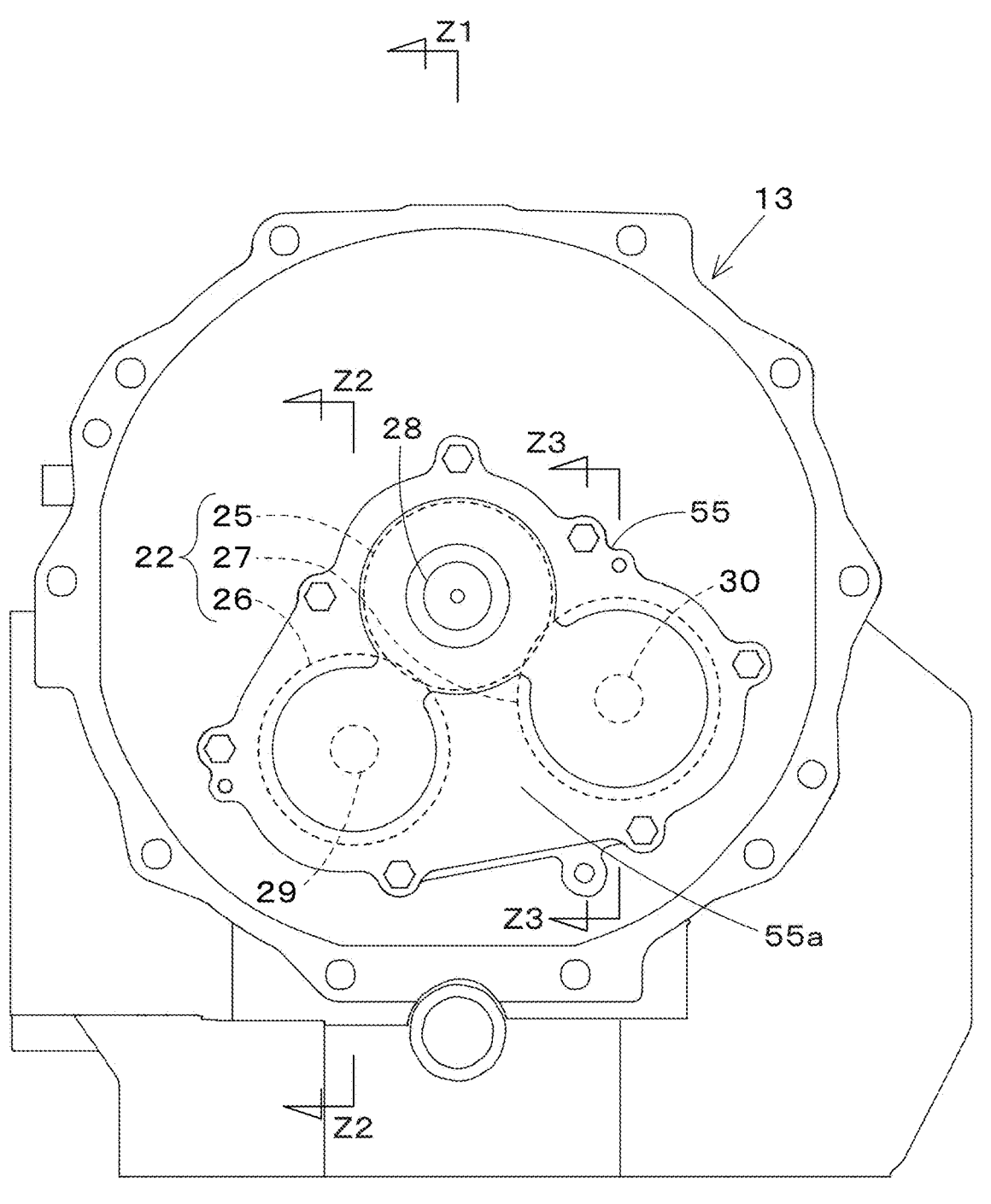
FIG. 5 is a front view of a continuously-variable-transmission casing.

As illustrated in FIG. 5, a primary transmission casing 55 that accommodates the primary transmission 22 is attached to the front surface of the front wall 42 of the continuously-variable-transmission casing 13. Thus, the travel-drive transmission casing 14 is coupled to a portion of the continuously-variable-transmission casing 13 opposite from the primary transmission casing 55.

Figure 6:
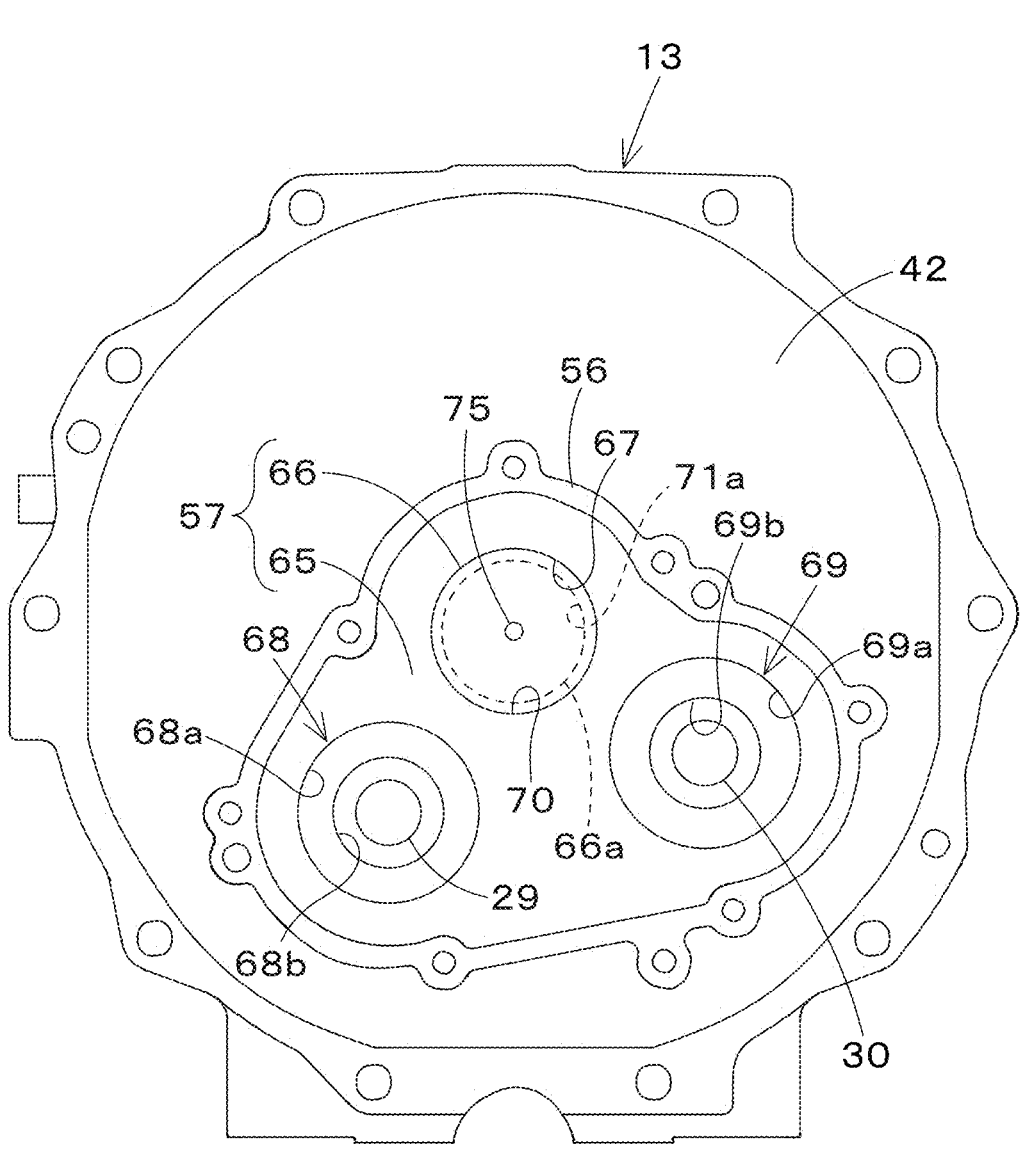
FIG. 6 is a front view of the continuously-variable-transmission casing from which a transmission casing has been removed.
Figure 7:
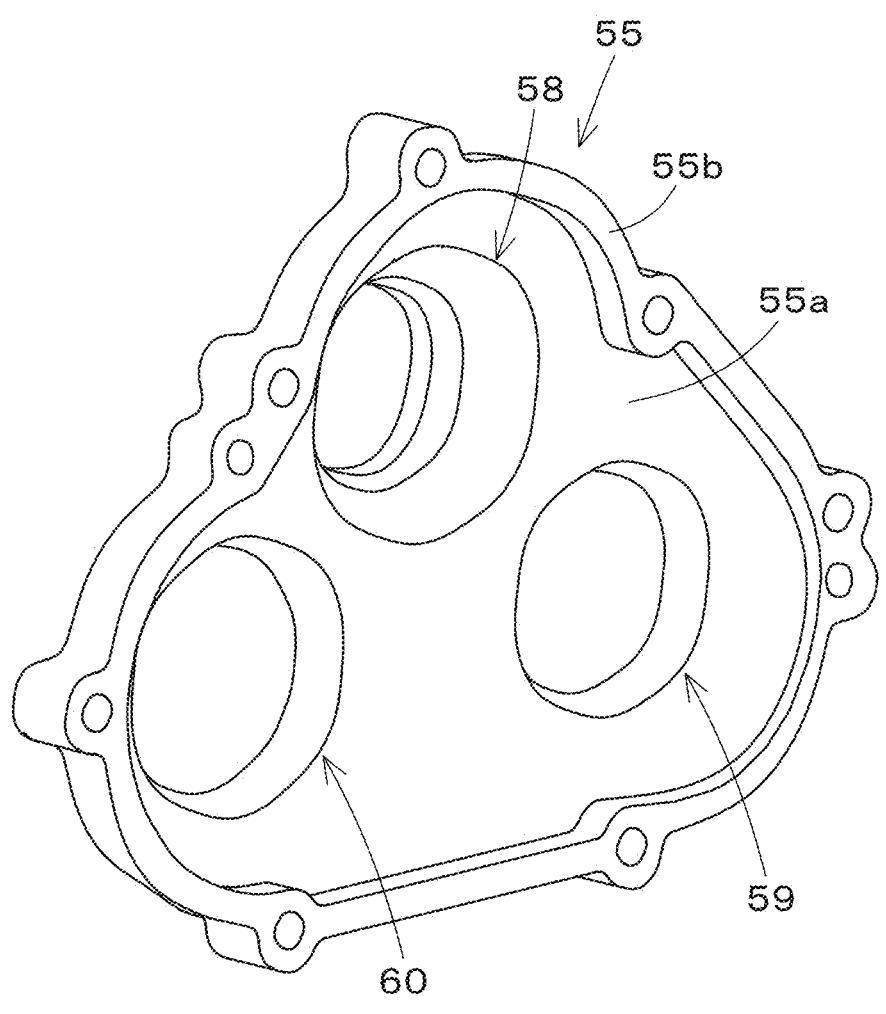
FIG. 7 is a perspective view of the transmission casing.

As illustrated in FIG. 6, an annular attachment bracket 56 is provided to protrude forward from the front surface of the front wall 42 of the continuously-variable-transmission casing 13. As illustrated in FIG. 7, the primary transmission casing 55 includes a case front-wall 55a and an outer peripheral wall 55b extending rearward from the outer periphery of the case front-wall 55a. As illustrated in FIG. 8, the primary transmission casing 55 is attached to the front wall 42 of the continuously-variable-transmission casing 13 by setting the rear surface of the outer peripheral wall 55*b* over the front surface of the attachment bracket 56 of the continuously-variable-transmission casing 13 and fixing the outer peripheral wall 55*b* to the attachment bracket 56 with bolts. As mentioned above, the front wall 42 defines the front portion of the hydraulic transmission chamber 41. There-fore, the primary transmission casing 55 is provided adja-cent to the hydraulic transmission chamber 41.

Figure 10:
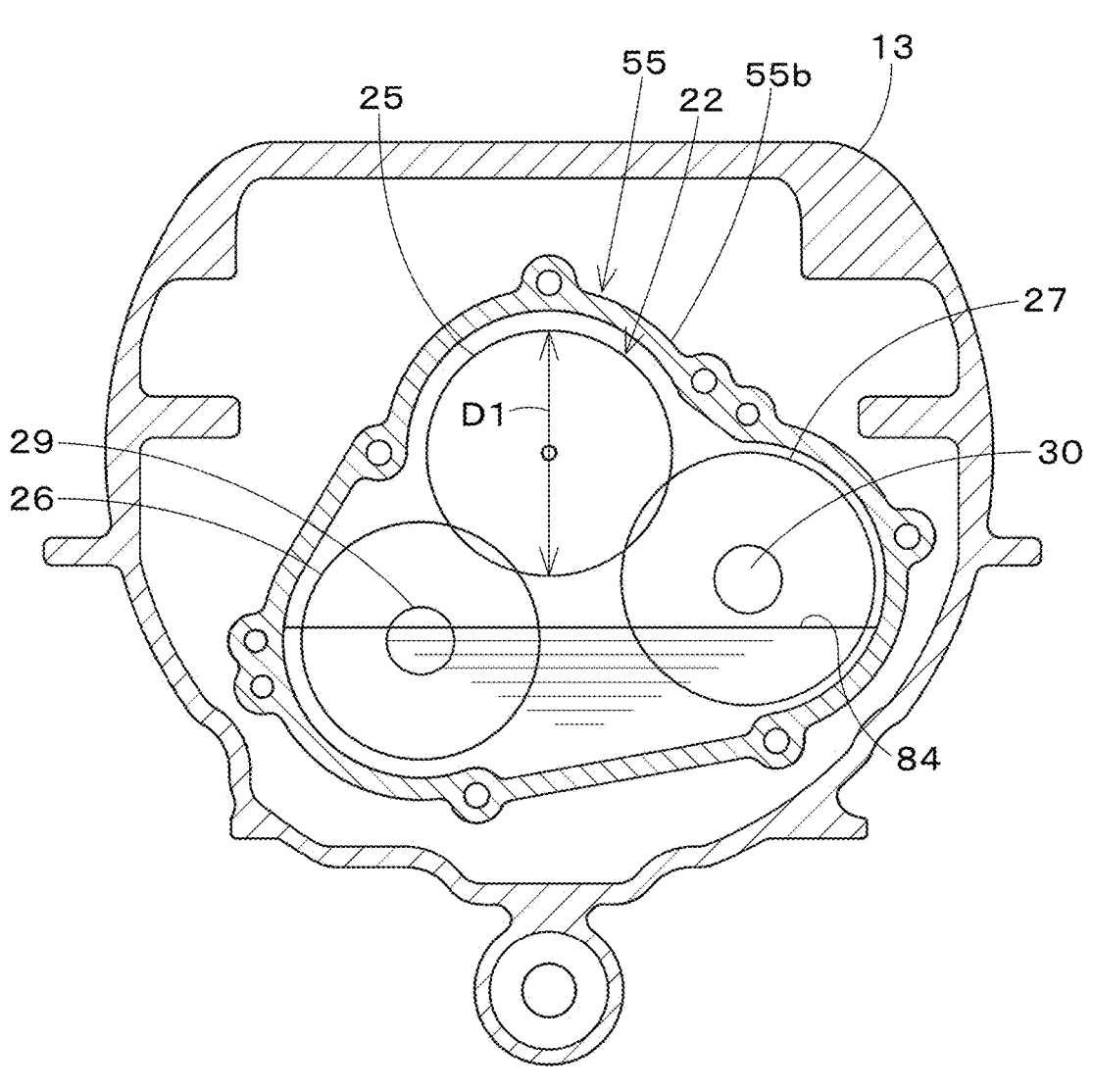
FIG. 10 is a diagram schematically illustrating a transmission, taken along line Z5-Z5 in FIG. 8.

As illustrated in FIG. 10, the input gear 25 is located higher than substantially the middle, in the vehicle-body width direction, of the interior of the primary transmission casing 55. The first transmission gear 26 is located diago-nally rightward of and lower than the input gear 25. The second transmission gear 27 is located diagonally leftward of and lower than the input gear 25. The second transmission gear 27 is located such that the upper end thereof is located higher than the upper end of the first transmission gear 26.

As illustrated in FIGS. 8, 12, and 13, the gears included in the primary transmission 22 are located astride the interior of the primary transmission casing 55 and the inside of the attachment bracket 56. Therefore, the interior of the primary transmission casing 55 and the space inside the attachment bracket 56 (the primary transmission casing 55 and a par-tition wall 57 to be described later) define a hydraulic transmission chamber that accommodates the primary trans-mission 22.

As illustrated in FIG. 7, the case front-wall 55*a* includes a support hole 58, a first recess 59, and a second recess 60. The support hole 58 is provided at a position corresponding to the input gear 25 (see FIG. 11). The first recess 59 is provided at a position corresponding to the first transmission gear 26 (see FIG. 12). The second recess 60 is provided at a position corresponding to the second transmission gear 27 (see FIG. 13). The first recess 59 and the second recess 60 are recessed forward from the rear surface of the case front-wall 55*a*.

Figure 11:
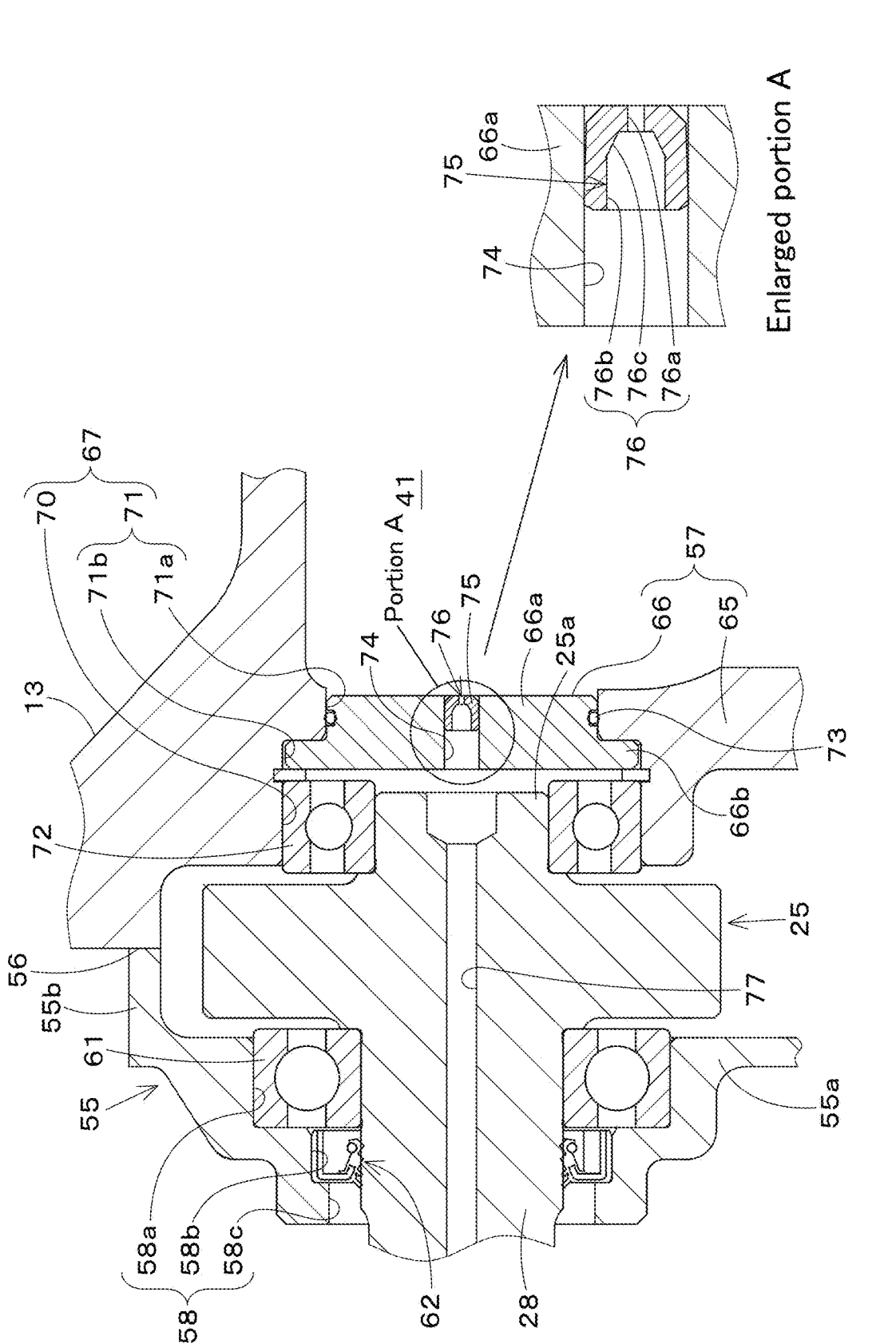
FIG. 11 is a cross-sectional view of a portion where an input gear is located.

As illustrated in FIGS. 8 and 11, the shaft 28 integrated with the input gear 25 extends through the support hole 58. The support hole 58 includes a first fitting hole 58*a*, a second fitting hole 58*b*, and a small-diameter hole 58*c*. The first fitting hole 58*a*, the second fitting hole 58*b*, and the small-diameter hole 58*c* are provided sequentially from the rear toward the front of the primary transmission casing 55. A shaft bearing 61 that rotatably supports the shaft 28 (input gear 25) is fitted in the first fitting hole 58*a*. An oil seal 62 that prevents fluid in the primary transmission casing 55 from leaking outward of the primary transmission casing 55 via the shaft bearing is fitted in the second fitting hole 58*b*. The small-diameter hole 58*c* has a diameter smaller than a diameter of the second fitting hole 58*b*. Accordingly, the fluid seal 62 is prevented from falling out.

As illustrated in FIG. 12, a shaft bearing 63 that rotatably supports the first transmission gear 26 (first supported por-tion 26*a*) is fitted in the first recess 59. As illustrated in FIG. 13, a shaft bearing 64 that rotatably supports the second transmission gear 27 (first supported portion 27*a*) is fitted in the second recess 60.

As illustrated in FIGS. 6 and 8, an inner portion of the attachment bracket 56 at the front wall 42 of the continu-ously-variable-transmission casing 13 defines the partition wall 57 as a wall that separates the hydraulic transmission chamber 41 and the interior of the primary transmission casing 55 from each other. The partition wall 57 includes a main wall 65 and a blocking structure 66. As illustrated in FIG. 6, the main wall 65 includes an open hole 67, a first insertion hole 68, and a second insertion hole 69. The open hole 67, the first insertion hole 68, and the second insertion hole 69 extend through the main wall 65.

As illustrated in FIG. 11, the open hole 67 includes a fitting hole 70 at a front portion and a stepped hole 71 at a rear portion. A shaft bearing 72 that rotatably supports the input gear 25 (supported portion 25*a*) is fitted in the fitting hole 70. The stepped hole 71 has a front portion with a large diameter, and has a rear portion with a small diameter that is smaller than that of the front portion. The blocking structure 66 is fitted in the stepped hole 71. The blocking structure 66 includes a circular-disk-shaped disk 66*a* fitted in a small-diameter portion 71*a* of the stepped hole 71 and an annular flange 66*b* fitted in a large-diameter portion 71*b* of the stepped hole 71. An O-ring 73 that prevents fluid in the hydraulic transmission chamber 41 from traveling through between the disk 66*a* and the small-diameter portion 71*a* of the stepped hole 71 and flowing into the primary transmission casing 55 is fitted to the outer peripheral surface of the disk 66*a*.

As illustrated in FIG. 11, the blocking structure 66 includes a through-hole 74 provided to extend therethrough in the front-rear direction K1. The through-hole 74 is provided at the center of the disk 66*a*. A plug 75 is inserted and fitted in the through-hole 74. The plug 75 is fitted to a rear portion of the through-hole 74.

As illustrated in FIG. 11, the plug 75 is provided with an orifice 76 extending therethrough in the front-rear direction. The orifice 76 allows the hydraulic transmission chamber 41 and the interior of the primary transmission casing 55 to communicate with each other. Thus, fluid flows into the primary transmission casing 55 from the hydraulic trans-mission chamber 41 via the orifice 76.

As illustrated in FIG. 11, the orifice 76 includes a narrow hole 76*a* communicating with the hydraulic transmission chamber 41, a wide hole 76*b* having a larger diameter than the narrow hole 76*a* and allowing the narrow hole 76*a* and the interior of the primary transmission casing 55 to com-municate with each other, and an increasing-diameter hole 76*c* connecting the narrow hole 76*a* and the wide hole 76*b* to each other and gradually increasing in diameter from the narrow hole 76*a* toward the wide hole 76*b*.

The hydraulic transmission chamber 41 is completely filled with fluid and is supplied with fluid from the supply pump 87, so that the fluid in the hydraulic transmission chamber 41 is in a pressurized state. Because the fluid passing through the orifice 76 flows into the primary trans-mission casing 55 from the narrow hole 76*a* via the increas-ing-diameter hole 76*c* and the wide hole 76*b*, the flow speed of the fluid flowing out from the orifice 76 can be alleviated.

As illustrated in FIG. 11, the orifice 76 is provided at the height position of the rotation center of the input gear 25. A fluid passage 77 extends in the front-rear direction K1 through the rotation center of each of the input gear 25 and the shaft 28 to supply fluid forward of the shaft 28. Thus, the orifice 76 is provided at a position corresponding to the fluid passage 77.

As illustrated in FIG. 12, the first insertion hole 68 includes a first fitting hole 68*a*, a second fitting hole 68*b*, and a third fitting hole 68*c*. The first fitting hole 68*a* is provided at a front portion of the first insertion hole 68. The second fitting hole 68*b* is provided at an intermediate portion of the first insertion hole 68. The second fitting hole 68*b* has a smaller diameter than the first fitting hole 68*a*. The third fitting hole 68*c* is provided at a rear portion of the first insertion hole 68. The third fitting hole 68*c* has a smaller diameter than the first fitting hole 68*a* and a larger diameter than the second fitting hole 68*b*.

A shaft bearing 78 that rotatably supports the first transmission gear 26 (second supported portion 26*b*) is fitted in the first fitting hole 68*a*. An fluid seal 79 is fitted in the second fitting hole 68*b*. A shaft bearing 80 that rotatably supports the first transmitting shaft 29 is fitted in the third fitting hole 68*c*. The fluid seal 79 prevents fluid from flowing from the shaft bearing 80 (hydraulic transmission chamber 41) toward the primary transmission casing 55.

As illustrated in FIG. 13, the second insertion hole 69 includes a first fitting hole 69*a*, a second fitting hole 69*b*, and a third fitting hole 69*c*. The first fitting hole 69*a* is provided at a front portion of the second insertion hole 69. The second fitting hole 69*b* is provided at an intermediate portion of the second insertion hole 69. The second fitting hole 69*b* has a smaller diameter than the first fitting hole 69*a*. The third fitting hole 69*c* is provided at a rear portion of the second insertion hole 69. The third fitting hole 69*c* has a smaller diameter than the first fitting hole 69*a* and a larger diameter than the second fitting hole 69*b*.

A shaft bearing 81 that rotatably supports the second transmission gear 27 (second supported portion 27*b*) is fitted in the first fitting hole 69*a*. An fluid seal 82 is fitted in the second fitting hole 69*b*. A shaft bearing 83 that rotatably supports the second transmitting shaft 30 is fitted in the third fitting hole 69*c*. The fluid seal 82 prevents fluid from flowing from the shaft bearing 83 (hydraulic transmission chamber 41) toward the primary transmission casing 55.

In this example embodiment, the hydraulic transmission chamber 41 and the interior of the primary transmission casing 55 are separated from each other by the partition wall 57, the open hole 67 provided in the main wall 65 of the partition wall 57 is blocked by the blocking structure 66, the outer peripheral surface of the disk 66*a* of the blocking structure 66 is provided with the O-ring 73, and the O-ring 73, the fluid seal 79, and the fluid seal 82 prevent fluid from flowing from the hydraulic transmission chamber 41 toward the primary transmission casing 55, so that the interior of the primary transmission casing 55 can be a separate chamber from the hydraulic transmission chamber 41. Furthermore, the hydraulic transmission chamber 41 and the interior of the primary transmission casing 55 can be separated from each other to prevent the fluid in the hydraulic transmission chamber 41 from flowing into the primary transmission casing 55 through or in any portion except for the orifice 76.

For example, assuming that the interior of the primary transmission casing 55 is in a state where the fluid flows to and from the hydraulic transmission chamber 41 and is completely filled with the fluid, the gear stirring resistance inside the primary transmission casing 55 is large. When the gear stirring resistance inside the primary transmission casing 55 is large, horsepower loss occurs due to the large gear stirring resistance.

In contrast, in this example embodiment, the interior of the primary transmission casing 55 is a separate chamber from the hydraulic transmission chamber 41, so that the height of a fluid level 84 of the fluid inside the primary transmission casing 55 can be reduced to be located at a vertically intermediate portion (intermediate portion in the up-down direction), as illustrated in FIG. 10. Accordingly, the gear stirring resistance inside the primary transmission casing 55 can be reduced. Consequently, horsepower loss can be reduced.

Figure 14:
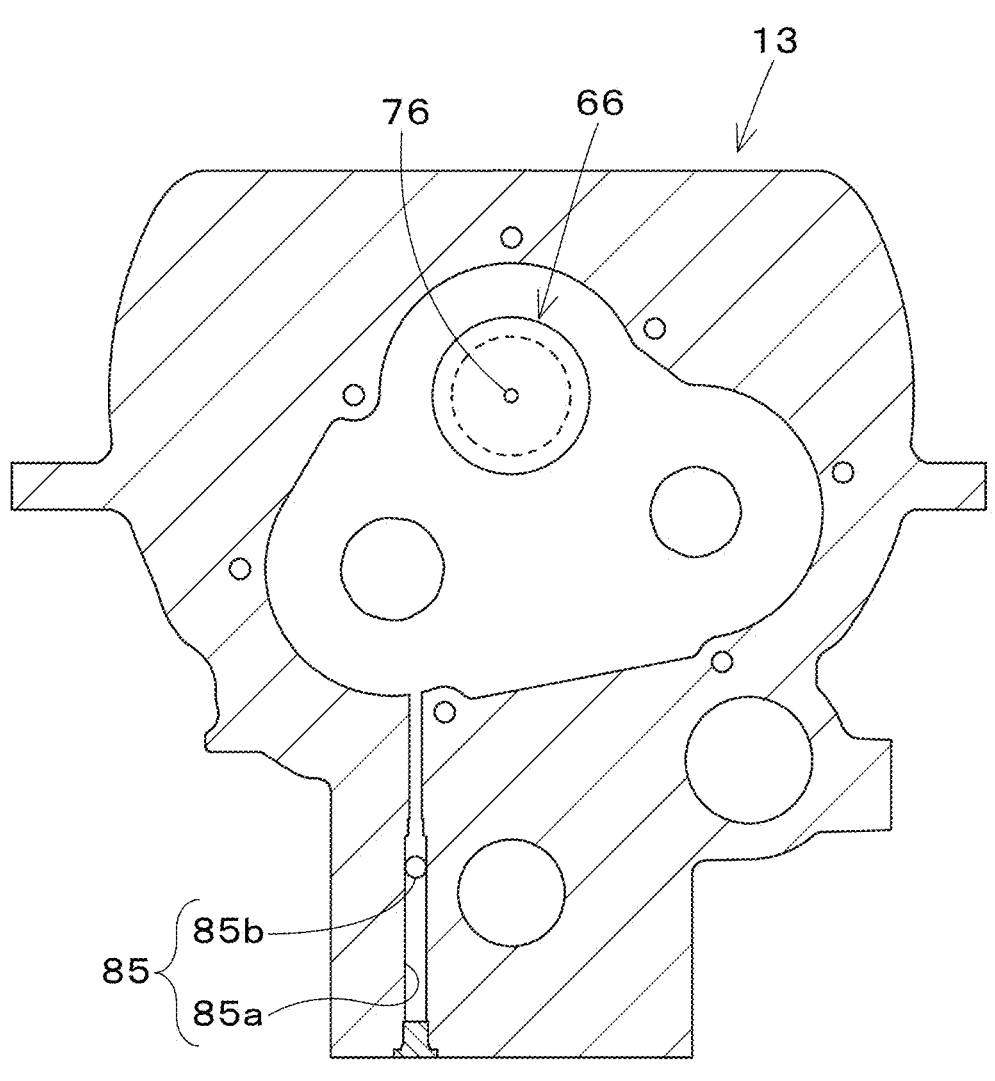
FIG. 14 is a front sectional view of the continuously-variable-transmission casing and illustrates an outflow passage.
Figure 15:
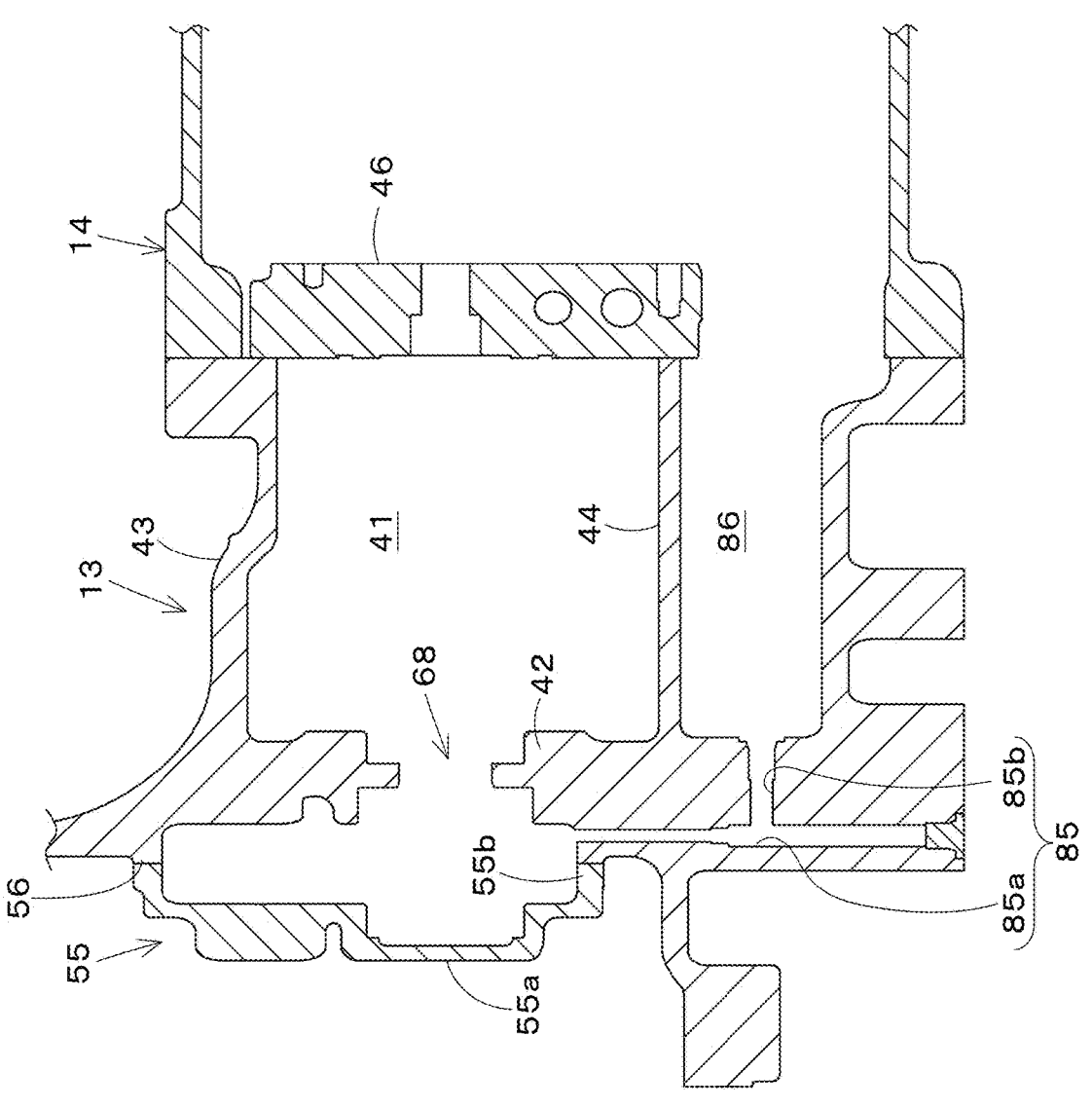
FIG. 15 is a cross-sectional view of the continuously-variable-transmission casing and illustrates the outflow passage.

As illustrated in FIGS. 14 and 15, the continuously-variable-transmission casing 13 is provided with an outflow passage 85 that causes the fluid inside the primary transmission casing 55 to flow out. The outflow passage 85 is configured to cause the fluid inside the primary transmission casing 55 to flow out into the travel-drive transmission casing 14. Specifically, the outflow passage 85 includes a first fluid passage 85*a* extending in the up-down direction and a second fluid passage 85*b* extending rearward from an intermediate portion of the first fluid passage 85*a*. The upper end of the first fluid passage 85*a* is open to the inside of the attachment bracket 56. Thus, the first fluid passage 85*a* (outflow passage 85) communicates with the interior of the primary transmission casing 55.

As illustrated in FIG. 15, an upper-end opening of the first fluid passage 85*a* is located at substantially the same height as the height position of the bottom of the primary transmission casing 55. Thus, the outflow passage 85 is configured to cause the fluid inside the primary transmission casing 55 to flow out from the bottom.

As illustrated in FIG. 15, the second fluid passage 85*b* allows the first fluid passage 85*a* and a cavity 86 provided in the continuously-variable-transmission casing 13 to communicate with each other. The cavity 86 is provided lower than the bottom wall 44 serving as the bottom of the hydraulic transmission chamber 41 in the continuously-variable-transmission casing 13. The cavity 86 is open rearward and communicates with the interior of the travel-drive transmission casing 14.

Therefore, the fluid inside the primary transmission casing 55 flows through the outflow passage 85 and the cavity 86 from the bottom of the primary transmission casing 55 and flows into the travel-drive transmission casing 14. Because the interior of the primary transmission casing 55 communicates with the interior of the travel-drive transmission casing 14, the height of the fluid level 84 of the fluid inside the primary transmission casing 55 is substantially the same as the height of the fluid level of the fluid inside the travel-drive transmission casing 14. Specifically, the outflow passage 85 and the cavity 86 define a communication passage that allows the interior of the primary transmission casing 55 and the interior of the travel-drive transmission casing 14 to communicate with each other. As a result, the height of the fluid level 84 of the fluid inside the primary transmission casing 55 can be set to the height of the vertically intermediate portion of the primary transmission casing 55.

The fluid flow amount (hole diameter) of the orifice 76 is set such that the hydraulic transmission chamber 41 is completely filled with fluid and that the fluid level 84 of the fluid inside the primary transmission casing 55 is located at the vertically intermediate portion inside the primary transmission casing 55.

Because the hydraulic transmission chamber 41 is supplied with purged fluid delivered from the supply pump 87, the cleanliness of the fluid inside the hydraulic transmission chamber 41 can be enhanced. Furthermore, because the hydraulic transmission chamber 41 is supplied with fluid delivered from the supply pump 87 and traveled through the oil filter 38, the cleanliness of the fluid inside the hydraulic transmission chamber 41 can be further enhanced.

The fluid inside the primary transmission casing 55 (hydraulic transmission chamber) flows toward the travel-drive transmission casing 14 from the bottom of the primary transmission casing 55, and the fluid in the hydraulic transmission chamber 41 flows into the primary transmission casing 55 from the orifice 76, thus achieving purging of the fluid in the primary transmission casing 55.

The structure for providing the aforementioned orifice 76 is not limited to the structure according to this example embodiment. For example, the orifice 76 may be provided not in the plug 75 but directly in the partition wall that separates the hydraulic transmission chamber 41 and the interior of the primary transmission casing 55 from each other.

Although the orifice 76 is provided at the height position of the rotation center of the input gear 25 in the above example embodiment, the position where the orifice 76 is provided is not limited. For example, the orifice 76 may be provided higher than the height of the fluid level 84 of the fluid inside the primary transmission casing 55. Furthermore, the orifice 76 may be provided at a height position within the range of a tip diameter D1 (see FIG. 10) of the input gear 25.

The open hole 67 does not have to be provided with the stepped hole 71 so long as the open hole 67 includes the fitting hole 70. In other words, the rear portion of the open hole 67 may be blocked. In this case, the blocking structure 66 is not provided.

Example embodiments of the present invention provide working vehicles 1 according to the following items.

(Item 1) A working vehicle 1 including a hydraulic transmission chamber 41 to accommodate a hydraulic pump 18 and a hydraulic motor 19 driven by fluid delivered from the hydraulic pump 18, and a primary transmission casing 55 to accommodate a primary transmission 22 including an input gear 25 to receive power from a prime mover 8 and a transmission gear 26 to transmit power from the input gear 25 to the hydraulic pump 18, the primary transmission casing 55 being adjacent to the hydraulic transmission chamber 41, wherein an interior of the primary transmission casing 55 is separated from the hydraulic transmission chamber 41.

In the working vehicle 1 according to item 1, the interior of the primary transmission casing 55 adjacent to the hydraulic transmission chamber 41 is a separate chamber from the hydraulic transmission chamber 41, so that the height of the fluid level 84 inside the primary transmission casing 55 can be reduced. Accordingly, the gear stirring resistance inside the primary transmission casing 55 can be reduced. Consequently, horsepower loss can be reduced.

(Item 2) The working vehicle 1 according to item 1, further including an orifice 76 to allow the hydraulic transmission chamber 41 and the interior of the primary transmission casing 55 to communicate with each other, wherein the hydraulic transmission chamber 41 and the interior of the primary transmission casing 55 are separated from each other such that fluid in the hydraulic transmission chamber 41 does not flow into the primary transmission casing 55 through or in any portion except for the orifice 76.

In the working vehicle 1 according to item 2, the height of the fluid level 84 inside the primary transmission casing 55 can be reduced, so that the gear stirring resistance inside the primary transmission casing 55 can be reduced.

(Item 3) The working vehicle 1 according to item 2, further including a supply pump 87 to replenish the hydraulic transmission chamber 41 with purged fluid, and an outflow passage 85 to cause fluid inside the primary transmission casing 55 to flow out, wherein a fluid flow amount of fluid flowing through the orifice 76 is such that the hydraulic transmission chamber 41 is completely filled with fluid and a fluid level of the fluid inside the primary transmission casing 55 is located at a vertically intermediate portion inside the primary transmission casing 55.

In the working vehicle 1 according to item 3, the cleanliness of the fluid in the hydraulic transmission chamber 41 and the primary transmission casing 55 can be enhanced. Furthermore, with the hydraulic transmission chamber 41 and the primary transmission casing 55 communicating with each other through the orifice 76, the height of the fluid level in the primary transmission casing 55 can be maintained at the height position of the vertically intermediate portion (i.e., intermediate portion in the up-down direction).

(Item 4) The working vehicle 1 according to item 3, further including a continuously-variable-transmission casing 13 including the hydraulic transmission chamber 41, and a travel-drive transmission casing 14 to accommodate a travel-drive transmission 20 operable to speed-change power output from the hydraulic motor 19 and transmit the speed-changed power to a drive wheel 4, 5, the travel-drive transmission casing being coupled to a portion of the continuously-variable-transmission casing 13 opposite from the primary transmission casing 55, wherein the supply pump 87 is operable to replenish the hydraulic transmission chamber 41 with fluid sucked from the inside of the travel-drive transmission casing 14 via an oil filter 37, and the outflow passage 85 is configured to cause fluid inside the primary transmission casing 55 to flow out into the travel-drive transmission casing 14.

In the working vehicle 1 according to item 4, the fluid in the travel-drive transmission casing 14 is purged and circulated, so that the cleanliness of the fluid in the hydraulic transmission chamber 41 and the primary transmission casing 55 can be maintained.

(Item 5) The working vehicle 1 according to any one of items 2 to 4, wherein the input gear 25 is located at an upper portion inside the primary transmission casing 55 and higher than the first transmission gear 26, and the orifice 76 is located at a height within a range of a tip diameter D1 of the input gear 25.

In the working vehicle 1 according to item 5, the fluid flowing out from the orifice 76 flows out to the primary transmission casing 55 from the upper portion of the primary transmission casing 55, so that the fluid can be favorably supplied into the primary transmission casing 55 in which the height of the fluid level 84 is set to the vertically intermediate portion.

(Item 6) The working vehicle 1 according to any one of items 2 to 5, further including a plug 75 to block a through-hole 74 extending through a wall 57 and to separate the hydraulic transmission chamber 41 and the interior of the primary transmission casing 55 from each other, wherein the orifice 76 is provided in the plug 75.

In the working vehicle 1 according to item 6, a case where the hole diameter of the orifice 76 is not appropriate can be dealt with by replacing the plug 75, and the fluid flow amount of the orifice 76 can be set readily.

(Item 7) The working vehicle 1 according to any one of items 2 to 6, wherein the orifice 76 includes a first hole 76a communicating with the hydraulic transmission chamber 41, and a second hole 76b having a diameter larger than a diameter of the first hole 76a to allow the first hole 76a and the interior of the transmission casing 55 to communicate with each other.

In the working vehicle 1 according to item 7, the flow speed of the fluid flowing out from the first hole 76a can be alleviated.

(Item 8) The working vehicle 1 according to item 7, wherein the orifice 76 includes an increasing-diameter hole 76c that connects the first hole 76a and the second hole 76b to each other, the increasing-diameter hole 76c gradually increasing in diameter from the first hole 76a toward the second hole 76b.

In the working vehicle 1 according to item 8, the flow speed of the fluid flowing out from the first hole 76a can be alleviated.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a hydraulic transmission chamber to accommodate a hydraulic pump and a hydraulic motor driven by fluid delivered from the hydraulic pump;
a primary transmission casing to accommodate a primary transmission including an input gear to receive power from a prime mover and a transmission gear to transmit power from the input gear to the hydraulic pump, the primary transmission casing being adjacent to the hydraulic transmission chamber; and
an orifice to allow the hydraulic transmission chamber and an interior of the primary transmission casing to communicate with each other, wherein
the interior of the primary transmission casing is separated from the hydraulic transmission chamber; and
the hydraulic transmission chamber and the interior of the primary transmission casing are separated from each other such that fluid in the hydraulic transmission chamber does not flow into the primary transmission casing through or in any portion except for the orifice.

2. The working vehicle according to claim 1, further comprising:
a supply pump to replenish the hydraulic transmission chamber with purged fluid; and
an outflow passage to cause fluid inside the primary transmission casing to flow out; wherein
a fluid flow amount of fluid flowing through the orifice is such that the hydraulic transmission chamber is completely filled with fluid and a fluid level of the fluid inside the primary transmission casing is located at a vertically intermediate portion inside the primary transmission casing.

3. The working vehicle according to claim 2, further comprising:
a continuously-variable-transmission casing including the hydraulic transmission chamber; and a travel-drive transmission casing to accommodate a travel-drive transmission operable to speed-change power output from the hydraulic motor and transmit the speed-changed power to a drive wheel, the travel-drive transmission casing being coupled to a portion of the continuously-variable-transmission casing opposite from the primary transmission casing; wherein
the supply pump is operable to replenish the hydraulic transmission chamber with fluid sucked from an inside of the travel-drive transmission casing via an oil filter; and
the outflow passage is configured to cause fluid inside the primary transmission casing to flow out into the travel-drive transmission casing.

4. The working vehicle according to claim 1, wherein
the input gear is located at an upper portion inside the primary transmission casing and higher than the transmission gear; and
the orifice is located at a height within a range of a tip diameter of the input gear.

5. The working vehicle according to claim 1, further comprising:
a plug to block a through-hole extending through a wall and to separate the hydraulic transmission chamber and the interior of the primary transmission casing from each other; wherein
the orifice is provided in the plug.

6. The working vehicle according to claim 1, wherein the orifice includes:
a first hole communicating with the hydraulic transmission chamber; and
a second hole having a diameter larger than a diameter of the first hole to allow the first hole and the interior of the primary transmission casing to communicate with each other.

7. The working vehicle according to claim 6, wherein the orifice includes an increasing-diameter hole that connects the first hole and the second hole to each other, the increasing-diameter hole gradually increasing in diameter from the first hole toward the second hole.

* * * * *